United States Patent [19]

Lundberg et al.

[11] Patent Number: 4,517,333

[45] Date of Patent: May 14, 1985

[54] NOVEL VISCOSIFIERS FOR AQUEOUS FLUIDS BASED ON POLYMER COMPLEXES

[75] Inventors: Robert D. Lundberg, Bridgewater; Robert R. Phillips, Spring Lake Heights; Dennis G. Peiffer, East Brunswick, all of N.J.

[73] Assignee: Exxon Research and Engineering Co., Florham Park, N.J.

[21] Appl. No.: 560,516

[22] Filed: Dec. 12, 1983

[51] Int. Cl.$^3$ .................... C08L 33/00; C08L 33/26; C08L 41/00

[52] U.S. Cl. ............................ 524/516; 260/DIG. 31; 523/175; 524/501; 524/504; 524/521; 524/800; 524/803; 524/804; 524/832; 525/203; 525/919

[58] Field of Search ............... 260/DIG. 31; 523/175; 524/800, 803, 804, 832, 501, 504, 516, 521; 525/203, 919

[56] References Cited

U.S. PATENT DOCUMENTS

| | | | |
|---|---|---|---|
| 3,432,454 | 3/1969 | Hibbard | 524/501 |
| 3,454,676 | 7/1969 | Busse | 260/DIG. 31 |
| 3,546,142 | 12/1970 | Michaels et al. | 524/501 |
| 3,660,338 | 5/1972 | Economou | 524/501 |
| 3,779,969 | 12/1973 | Slagel et al. | 523/175 |
| 3,867,330 | 2/1975 | Frisque | 524/521 |
| 3,868,432 | 2/1975 | Keegan et al. | 524/516 |
| 3,926,890 | 12/1975 | Huang et al. | 524/832 |
| 3,969,434 | 7/1976 | Powell et al. | 260/DIG. 31 |
| 4,040,984 | 8/1977 | Sharpe et al. | 524/521 |
| 4,088,623 | 5/1978 | Pearl | 523/175 |
| 4,134,870 | 1/1979 | Makowski et al. | 260/DIG. 31 |
| 4,145,379 | 3/1979 | Lundberg et al. | 260/DIG. 31 |
| 4,151,137 | 4/1979 | Duvdevani et al. | 260/DIG. 31 |
| 4,153,055 | 5/1979 | Etes | 524/521 |
| 4,196,236 | 4/1980 | Lundberg et al. | 260/DIG. 31 |

*Primary Examiner*—Ronald W. Griffin
*Attorney, Agent, or Firm*—Richard E. Nanfeldt

[57] ABSTRACT

The present invention relates to viscosification agents for aqueous solutions in which the viscosification agents are mixtures of water soluble polymer backbone containing an anionic comonomer and a copolymer of a water soluble polymer backbone containing a cationic comonomer.

9 Claims, No Drawings

NOVEL VISCOSIFIERS FOR AQUEOUS FLUIDS BASED ON POLYMER COMPLEXES

FIELD OF THE INVENTION

The present invention relates to viscosification agents for aqueous solutions in which the viscosification agents are mixtures of water soluble polymer backbone containing an anionic comonomer and a copolymer of a water soluble polymer backbone containing a cationic co-monomer.

BACKGROUND OF THE INVENTION

There has been a major need for techniques to viscosify hydrocarbon and aqueous solutions so as to control viscosity of such diluents broadly. Typically, a variety of polymers, generally high in molecular weight, are employed to achieve this objective. Unfortunately solutions based on such polymers suffer major problems in that: (a) large amounts of polymers, or else high molecular weight polymers, are required to achieve a suitable degree of viscosification; (b) the resulting polymer solutions exhibit viscosities which diminish markedly as polymer concentration is reduced or as temperature is increased; (c) these conventional solutions typically are shear thinning as well, i.e., the viscosities decrease as shear rate or rate of flow increases.

We have observed, in the course of previous research on associating polymers, that sulfonate ionomers in mixed solvents based on hydrocarbons and alcohols can give rise to solutions whose viscosities actually increase or remain essentially constant as temperature increases. While these phenomena are of scientific and technological interest, all attempts to extend these findings to aqueous sytems were until recently unsuccessful. We have found, however, that a combination of a water soluble polymer bearing a low to moderate level of anionic groups, and a second water soluble polymer bearing cationic groups at a low to moderate level, when combined under precisely defined stoichiometric ratios, will give rise to solutions which: (a) display very unusual viscosity-temperature effects such that viscosity can increase with temperature; (b) display very unique viscosity-concentration effects such that viscosity can actually increase as polymer concentration is reduced. In the instant case, we describe this behavior in the absence of added salt; a companion case describes how such polymers can control viscosity of aqueous solutions at high salt levels.

SUMMARY OF THE INVENTION

The present invention relates to viscosification agents for aqueous solutions in which the viscosification agents are mixtures of water soluble polymer backbone containing an anionic comonomer and a copolymer of a water soluble polymer backbone containing a cationic co-monomer.

GENERAL DESCRIPTION OF THE INVENTION

The aqueous viscosification agents of the instant invention are formed by the interaction of a mixture of two different polymers. There are a number of copolymers which are suitable for forming the complexes.

A preferred system is comprised of a mixture of (A) copolymers of acrylamide and a neutralized styrene sulfonate where the sulfonate content ranges from about 1 weight percent up to about 50 weight percent and (B) copolymers of acrylamide and a quaternary ammonium salt such as N,N,N-tri-methylammonium-propylmethacrylamide:

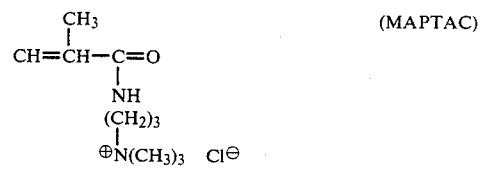

wherein the level of ionic monomer again ranges from about 1 weight percent to about 50 weight percent.

A variety of other polymer systems can be employed in this invention with the following constraints. Copolymer (A) should be based on a largely water soluble polymer backbone containing an anionic comonomer. The water soluble polymer backbone of copolymer (A) is selected from the group consisting of polyacrylamide, polyvinyl pryolidone, polyethylene oxide, polyvinyl alcohol and polymethacrylamide thereof, wherein polyacrylamide is preferred. The anionic comonomer of copolymer (A) is selected from the group consisting of, $\alpha, \beta$ ethylenically unsaturated monomers having sulfonate, carboxylate or phosphonate groups present, neutralized with metal or amine cations. Especially preferred and representative species are styrene sulfonate, vinyl sulfonate, allyl sulfonate, acrylamidopropyl sulfonate, wherein the sulfonate groups are neutralized with an ammonium cation or a metal cation selected from the group consisting of Groups IA, IIA, IB and IIB of the Periodic Table of Elements. Copolymer (A) contains about 1 to about 50 weight percent of the anionic comonomer, more preferably about 2 to about 30 and most preferably about 3 to about 20. The number average molecular weight of copolymer (A) is about 10,000 to about 5,000,000, more preferably about 20,000 to about 3,000,000, and most preferably about 50,000 to about 1,000,000. Copolymer (A) is generally prepared by techniques well-known in the field of polymer chemistry. Preferably free radical initiation is employed with polymers based on ethylenically unsaturated monomers such as acrylamide. The copolymerization of acrylamide and sodium styrene sulfonate, ffor exmple, is conducted in water as described in the examples below using conventional initiators such as potassium persulfate. Typically, these polymers are prepared in this manner, however, there are many variations which can be practical without departing from the spirit of this invention.

Copolymer (B) should be based on a largely water soluble polymer backbone containing a cationic species. The water soluble polymer backbone of copolymer (B) is selected from the group consisting of polyacrylamide, polyvinyl pryolidone, polyethylene oxide, polyvinyl alcohol and polymethylacrylamide, wherein polyacrylamide is preferred. The cationic comonomer of copolymer (B) is selected from, ethylenically unsaturated monomer with quaternary bases or pyridinium groups present as functional groups. N,N,N-trimethyl ammonium propylmethacrylamide and vinyl pyridine are especially preferred. Copolymer (B) contains about 1 to about 50 weight percent of the cationic comonomer, more preferably about 2 to about 30, and more preferably about 3 to about 20. The number average molecular weight of Copolymer (B), as determined by gel permeation chromatography, is about 10,000 to about 5,000,000, more preferably about 20,000 to about 3,000,000, and most preferably about 50,000 to about 1,000,000. Copolymer (B) is prepared by the same techniques commonly employed in the preparation of copolymer (A), as described in the examples below.

An important characteristic of the materials employed in this invention is the stoichiometry of the ionic species when polymers (A) and (B) are blended together. A wide variation in such stoichiometries has been explored wherein the ratio of anionic/cationic species varies from 30/1 to 1/30. An even wider range of such stoichiometries is believed to be within the scope of this invention. However, it has been found that when this ratio is in the vicinity of 1/1, the solution behavior of such complexes is less remarkable. However, upon substantial departures from this ratio in aqueous systems, the resulting solutions exhibit unusual viscosity behavior as a function of temperature or concentration.

Accordingly, the ratio of the anion/cationic functionalities can range from 45/1 to about 1/45 in this invention. More preferably the ratio of the anionic/cationic species can be from about 45/1 to about 1.1/1, most preferably about 30/1 to about 1.2/1. Alternately, the ratio of anion/cationic groups can be about 1/45 to about 1/1.1, more preferably from about 1/30 to about 1/1.2.

The complex mixture of copolymers (A) and (B) are ideally prepared by mixing separate aqueous solutions of the copolymers (A) and (B) together. The aqueous solution of copolymer (A) contains about 0.02 to about 10 grams of copolymer (A) per 100 ml. of water, more prefereably about 0.04 to about 8 and most preferably about 0.05 to about 5. The aqueous solution of copolymer (B) contains about 0.02 to about 10 grams of copolymer (B) per 100 ml. of water, more preferably about 0.04 to about 8, and most preferably about 0.05 to about 5.

DESCRIPTION OF THE PREFERRED EMBODIMENTS

The following examples illustrate the present invention without; however limiting the same hereto.

EXAMPLE 1

A representative example for the synthesis of acrylamide (AM)-sodium styrene sulfonate (SSS) copolymer is outlined below.

Into a 1-liter, 4-neck flask add:
25 g acrylamide
12.75 g sodium styrene sulfonate
500 ml. distilled water The solution was purged with nitrogen gas for one hour to remove dissolved oxygen. As the nitrogen gas purge began, the solution was heated to 55° C. At this point, 0.05 g potassium persulfate was added to the solution. After 24 hours, the polymer was precipitated from solution with acetone. Subsequently, the resulting polymer was washed several times with a large excess of acetone and dried in a vacuum over an 60° C. for 24 hours. Elemental analysis shows a sulfur content of 4.16 weight percent which corresponds to 11.2 mole percent sodium styrene sulfonate.

EXAMPLE 2

A representative example for the synthesis of an acrylamide, methacrylamidopropyltrimethylammonium chloride (MAPTAC) copolymer is essentially identical to the previous polymerization, except for the substitution of SSS for an appropriate quantity of MAPTAC, as shown below.

25.0 g acrylamide
27.4 g MAPTAC (50% solution)

The reaction is carried out utilizing the above specifications. Elemental analysis shows a chlorine content of 4.75 weight percent corresponding to 11.9 mole percent MAPTAC.

As is well-known to those versed in the art, the level of ionic monomers attached to the growing polymer chain is directly related to the initial concentration of the reacting species. Therefore, modulation of the ionic charge within the polymer structure was accomplished through changing the initial anionic or cationic vinylic monomer concentration.

A series of copolymers represented by Examples 1 and 2 were prepared of different compositions as shown in Table I.

TABLE I

Representative Copolymers Having Anionic and Cationic Groups Incorporated

| | | Actual Mole % Ionic Group Incorporated |
|---|---|---|
| I-A | 95 mole % Acrylamide/5 mole % Sodium Styrene Sulfonate | 3.06 |
| I-B | 85 mole % Acrylamide/15 mole % Sodium Styrene Sulfonate | 11.2 |
| I-C | 70 mole % Acrylamide/30 mole % Sodium Styrene Sulfonate | 28.8 |
| I-D | 60 mole % Acrylamide/40 mole % Sodium Styrene Sulfonate | 37.5 |
| II-E | 95% mole % Acrylamide/5 mole % MAPTAC | 4.0 |
| II-F | 85% mole % Acrylamide/15 mole % MAPTAC | 11.9 |
| II-G | 70 mole % Acrylamide/30 mole % MAPTAC | 22.8 |

EXAMPLE 3

For each mixture that forms the complex, a solution of the acrylamide-N,N,N-trimethylammoniumpropylmethacrylamide copolymer (abbreviated as MAPTAC) and acrylamide-sodium styrene sulfonate copolymer (abbreviated as SSS) was prepared separately in water. Concentration of each solution was calculated so that when equal amounts of MAPTAC of SSS solution were blended, the required mol % ratio of MAPTAC/SSS was obtained, while maintaining a constant polymer concentration in the blend of 2%. The blend was prepared by pouring the acrylamide-sodium styrene sulfonate solution into the stirred acrylamide-N,N,N-trimethylammoniumpropylmethacrylamide solution and stirring several hours to ensure optimum mixing and blending. The various concentrations of each blend were obtained by diluting the 2% concentration blend with water.

Thus a series of SSS/MAPTAC Rations were prepared of approximately 1.2/1, 6.01/1, and 24/1 employing samples I-C and II-E. Following the procedures above the samples were prepared as follows (where AM represents acrylamide):

III-A—0.286 g I-C (70 AM/30 SSS) in 50 ml water
III-B—1.714 g II-E (95 AM/5 MAPTAC) in 50 ml water
III-C—0.909 g I-C in 50 ml water
III-D—1.091 g I-E in 50 ml water III-E—1.540 g I-C in 50 ml water
III-F—0.462 g II-E in 50 ml water The samples were stirred at ambient temperature to dissolve, then the viscosity was obtained of each solution at 25° C.

Blends of the above solutions were prepared by blending III-A with III-B, III-C with III-D, and III-E with III-F, and the resulting blends designated as III-AB, III-CD, III-EF, respectively.

The viscosity of the individual components measured with a Brookfield viscometer at 25° C. at several spindle speeds are shown in Table II.

The viscosities of the blends at various temperatures, and spindle speeds are shown in Table III.

TABLE II

Viscosities of Individual Copolymer Solutions III-A, B, C, D, E, and F

| Sample | Spindle RPM | Viscosity LP |
|---|---|---|
| III-A | 6 | 27.8 |
|  | 3 | 28 |
|  | 1.5 | 28.4 |
| III-B | 3 | 3560 |
|  | 1.5 | 3860 |
|  | 0.6 | 4250 |
| III-C | 3 | 75 |
|  | 1.5 | 74 |
|  | 0.6 | 74 |
| III-D | 12 | 695 |
|  | 6 | 740 |
|  | 3 | 760 |
| III-E | 1.5 | 156.4 |
|  | 0.6 | 157 |
|  | 0.3 | 160 |
| III-F | 30 | 130 |
|  | 12 | 135 |
|  | 6 | 135 |

TABLE III

Vicosities of Anionic/Cationic Solution Blends All at 2% Polymer with Functional Ratios of 1.2/1, 6/1, and 24/1 SSS/MAPTAC

| Sample Blend | 0° C. | | 25° C. | | 50° C. | | 75° C. | | 90° C. | |
|---|---|---|---|---|---|---|---|---|---|---|
| Blend | RPM | Vis | RPM | Vis | RPM | Vis | RPM | Vis | RPM | Vis |
| III-AB | 1.5 | 102 | 3 | 82.0 | 6 | 56.2 | 6 | 43.5 | 6 | 40.1 |
|  | 0.6 | 120 | 1.5 | 94.0 | 3 | 65.2 | 3 | 50.8 | 3 | 45.0 |
|  | 0.3 | 136 | 0.6 | 112.0 | 1.5 | 74.4 | 1.5 | 58.0 | 1.5 | 46.4 |
| III-CD | 1.5 | 19740 | 1.0 | 11600 | 3 | 4880 | 3 | 3370 | 3 | 2040 |
|  | 0.6 | 24600 | 0.6 | 14300 | 1.5 | 5760 | 1.5 | 4200 | 1.5 | 2520 |
|  | 0.3 | 28000 | 0.3 | 17800 | 0.6 | 7600 | 0.5 | 5400 | 0.6 | 3600 |
| III-EF | 12 | 690 | 12 | 365 | 30 | 196 | 30 | 146 | 30 | 116 |
|  | 6 | 790 | 6 | 400 | 12 | 220 | 12 | 162.5 | 12 | 127.5 |
|  | 3 | 910 | 3 | 420 | 6 | 230 | 6 | 125 | 6 | 130 |

The blended solutions above at 2% concentration were diluted by the addition of water to form a series of solutions of 1.5, 1.0, and 0.5% concentration by the procedure described below and designated as indicated. Their viscosities at 0°, 25°, 50° and 75° C. were then measured as recorded in Table IV.

Solutions were diluted as follows:

| | | |
|---|---|---|
| III-AB-I | 34.5 ml III-AB + 11.5 ml water | } now 1.5% con. |
| III-CD-I | 34.5 ml III-CD + 11.5 ml water | |
| III-EF-I | 34.5 ml III-EF + 11.5 ml water | |
| III-AB-II | 30 ml III-AB-I + 15 ml water | } now 1% con. |
| III-CD-II | 30 ml III-CD-I + 15 ml water | |
| III-EF-II | 30 ml III-EF-I + 15 ml water | |
| III-AB-III | 25 ml III-AB-II + 25 ml water | } now 0.5% con. |
| III-CD-III | 25 ml III-CD-II + 25 ml water | |
| III-EF-III | 25 ml III-EF-II + 25 ml water | |

TABLE IV

Viscosities of Solution Blends at Various Concentrations

| Sample | 0° C. | | 25° C. | | 50° C. | | 75° C. | |
|---|---|---|---|---|---|---|---|---|
|  | RPM | Vis | RPM | Vis | RPM | Vis | RPM | Vis |
| | 1.5% Con. | | | | | | | |
| III-AB-I | 6 | 34.2 | 6 | 24.6 | 12 | 17.0 | 12 | 13.1 |
|  | 3 | 37.2 | 3 | 27.2 | 6 | 18.5 | 6 | 14.3 |
|  | 1.5 | 40.8 | 1.5 | 30.0 | 3 | 20.4 | 3 | 15.6 |
| III-CD-I | 1.5 | 5800 | 6 | 2310 | 6 | 1375 | 12 | 735 |
|  | 0.6 | 7200 | 3 | 2780 | 3 | 1600 | 6 | 860 |
|  | 0.3 | 7600 | 1.5 | 3240 | 1.5 | 1840 | 3 | 950 |
| III-EF-I | 12 | 665 | 30 | 292 | 30 | 177 | 30 | 116 |
|  | 6 | 775 | 12 | 365 | 12 | 210 | 12 | 155 |
|  | 3 | 1080 | 6 | 440 | 6 | 235 | 6 | 160 |
| | 1% Con. | | | | | | | |
| III-AB-II | 12 | 17.3 | 12 | 11.1 | 12 | 7.7 | 30 | 5.1 |
|  | 6 | 18.5 | 6 | 11.7 | 6 | 8.2 | 12 | 5.4 |
|  | 3 | 19.6 | 3 | 12.4 | 3 | 8.4 | 6 | 5.8 |
| III-CD-II | 6 | 366 | 12 | 201 | 12 | 121 | 30 | 71.2 |
|  | 3 | 386 | 6 | 215 | 6 | 126 | 12 | 75.5 |
|  | 1.5 | 400 | 3 | 222 | 3 | 128 | 6 | 80.0 |
| III-EF-II | 6 | 470 | 12 | 229 | 12 | 125.5 | 30 | 72.4 |
|  | 3 | 590 | 6 | 258 | 6 | 136 | 12 | 82.5 |
|  | 1.5 | 620 | 3 | 280 | 3 | 144 | 6 | 84.0 |
| | 0.5% con. | | | | | | | |
| III-AB-III | 30 | 7.4 | 30 | 4.32 | 30 | 2.8 | 30 | 2.12 |
|  | 12 | 7.75 | 12 | 4.5 | 12 | 2.9 | 12 | 2.25 |
|  | 6 | 8.0 | 6 | 4.7 | 6 | 3.0 | 6 | 2.3 |
| III-CD-III | 12 | 131 | 30 | 69.4 | 30 | 42.8 | 30 | 26.8 |
|  | 6 | 145 | 12 | 82.0 | 12 | 47.5 | 12 | 28.0 |
|  | 3 | 162 | 6 | 92.0 | 6 | 48.0 | 6 | 27.0 |
| III-EF-III | 12 | 156 | 30 | 74.2 | 30 | 42.4 | 30 | 28.8 |
|  | 6 | 172 | 12 | 82.5 | 12 | 45.5 | 12 | 29.0 |
|  | 3 | 184 | 6 | 90.0 | 6 | 46.0 | 6 | 31.0 |

EXAMPLE 4

Following the procedures described above, an additional series of blends were prepared, however, with the MAPTAC/SSS ratios now having the ratios 1.24/1, 6.2/1 and 24/1. These blends were obtained by combining solutions of polymer based on I-A and II-G, initially to a total polymer concentration of 2%. Those solutions were then diluted to 1.5, 1 and 0.5% concentration. The dilutions were effected as described below and the viscosities observed are noted in Table V.

Samples employed based on I-A and II-G at 2%:

IV-AB (1.24/1 22.8 MAPTAC/3.06 SSS, 2% conc. in water)

IV-CD (6.2/1 22.8 MAPTAC/3.06 SSS, 2% conc. in water)

IV-EF (24/1 22.8 MAPTAC/3.06 SSS, 2% conc. in water)

These samples were then diluted as shown below:

| IV-AB-I | 34.5 ml IV-AB + 11.5 ml water | now 1.5% con. |
| IV-CD-I | 34.5 ml IV-CD + 11.5 ml water | |
| IV-EF-I | 34.5 ml IV-EF + 11.5 ml water | |
| IV-AB-II | 30 ml IV-AB-I + 15 ml water | now 1% con. |
| IV-CD-II | 30 ml IV-CD-I + 15 ml water | |
| IV-EF-II | 30 ml IV-EF-I + 15 ml water | |
| IV-AB-III | 25 ml IV-AB-II + 25 ml water | now 0.5% con. |
| IV-CD-III | 25 ml IV-CD-II + 25 ml water | |
| IV-EF-III | 25 ml IV-EF-II + 25 ml water | |

The solution viscosities at these various dilutions are shown in Table V.

TABLE V

Viscosities of MAPTAC/SSS Solution Blends at Various Ratios and Concentration Where MAPTAC is the Excess Component
Viscosity at 0, 25, 50, 75° C.

| Sample | 0° C. RPM | Vis | 25° C. RPM | Vis | 50° C. RPM | Vis | 75° C. RPM | Vis |
|---|---|---|---|---|---|---|---|---|
| | | | 2% Conc. | | | | | |
| IV-AB | 1.5 | — | 1.5 | 264.8 | 1.5 | 153.6 | 3 | 92.0 |
| | 0.6 | 525 | 0.6 | 294 | 0.6 | 165 | 1.5 | 95.2 |
| | 0.3 | 526 | 0.3 | 296 | 0.3 | 172 | 0.6 | 102 |
| IV-CD | 1.5 | 178 | 1.5 | 128 | 3 | 83 | 3 | 64.8 |
| | 0.6 | 242 | 0.6 | 171 | 1.5 | 100 | 1.5 | 78.0 |
| | 0.3 | 304 | 0.3 | 212 | 0.6 | 135 | 0.6 | 107 |
| IV-EF | 1.5 | — | 1.5 | — | 1.5 | — | 1.5 | — |
| | 0.6 | 860 | 0.6 | 548 | 0.6 | 504 | 0.6 | 431 |
| | 0.3 | 910 | 0.3 | 570 | 0.3 | 530 | 0.3 | 476 |
| | | | 1.5% | | | | | |
| IV-AB-I | 1.5 | 264 | 1.5 | 150.4 | 3 | 84.4 | 3 | 53.2 |
| | 0.6 | 288 | 0.6 | 170 | 1.5 | 88.5 | 1.5 | 57.6 |
| | 0.3 | 304 | 0.3 | 186 | 0.6 | 100 | 0.6 | 68.0 |
| IV CD-I | 3 | 80.4 | 3 | 54.8 | 6 | 37.2 | 6 | 28.6 |
| | 1.5 | 95.2 | 1.5 | 61.2 | 3 | 42.2 | 3 | 33.6 |
| | 0.6 | 120 | 0.6 | 80.0 | 1.5 | 50.4 | 1.5 | 40.0 |
| IV E-F-I | 1.5 | — | 1.5 | — | 1.5 | — | 1.5 | — |
| | 0.6 | 568 | 0.6 | 452 | 0.6 | 485 | 0.6 | 447 |
| | 0.3 | 640 | 0.3 | 502 | 0.3 | 540 | 0.3 | 506 |
| | | | 1% | | | | | |
| IV AB-II | 1.5 | 118 | 3 | 69.2 | 3 | 45.6 | 6 | 28.1 |
| | 0.2 | 128 | 1.5 | 73.6 | 1.5 | 48.4 | 3 | 30.0 |
| | 0.3 | 134 | 0.6 | 81.0 | 0.6 | 55.0 | 1.5 | 32.0 |
| IV CD-II | 6 | 32.6 | 6 | 22.4 | 12 | 14.9 | 12 | 11.7 |
| | 3 | 36.2 | 3 | 24.4 | 6 | 16.7 | 6 | 12.9 |
| | 1.5 | 40.8 | 1.5 | 28.4 | 3 | 18.4 | 3 | 14.2 |
| IV EF-II | 1.5 | 372 | 1.5 | — | 1.5 | — | 1.5 | — |
| | 0.6 | 455 | 0.6 | 668 | 0.6 | 880 | 0.6 | 720 |
| | 0.3 | 470 | 0.3 | 716 | 0.3 | 900 | 0.3 | 730 |
| | | | 0.5% | | | | | |
| IV AB-III | 3 | 43.2 | 6 | 24.1 | 12 | 14.8 | 12 | 10.45 |
| | 1.5 | 45.6 | 3 | 26.0 | 6 | 15.5 | 6 | 11.0 |
| | 0.6 | 48.0 | 1.5 | 28.0 | 3 | 16.2 | 3 | 11.2 |
| IV CD-III | 12 | 13.2 | 30 | 7.72 | 30 | 5.54 | 30 | 4.26 |
| | 6 | 13.7 | 12 | 8.3 | 12 | 6.05 | 12 | 4.6 |
| | 3 | 14.6 | 6 | 8.8 | 6 | 6.5 | 6 | 5.0 |
| IV EF-III | 1.5 | 309.6 | 1.5 | 317.6 | 1.5 | 260.8 | 1.5 | 187.2 |
| | 0.6 | 416 | 0.6 | 454 | 0.6 | 351 | 0.6 | 234 |
| | 0.3 | 492 | 0.3 | 528 | 0.3 | 404 | 0.3 | 270 |

In Tables III, IV, and V viscosity temperature profiles are provided for a range of polymer concentrations. Clearly, when the ratio of cationic to anionic species approaches 24/1, the resulting polymer solutions behave very unusually with the solution viscosity actually increasing with temperature.

One of the most remarkable observations in Tables IV and V is the viscosity dependence on polymer concentration. Unlike conventional polymer solutions, the viscosity values shown here do not decrease monotonically as the polymer concentration is reduced. In fact, over the concentration range of 2% to 1%, the solution viscosity actually increases in selected cases especially when the ratio of one ionic species (i.e. MAPTAC) is much greater than the other (i.e. SSS) by a factor of 20 or so. The behavior appears unique and possibly the first example of such polymer solution behavior where dilution enhances viscosity.

Similarly, the observations demonstrate that at high ratios of one ionic component over the other the solution viscosity can remain constant or actually increase substantially with temperature. While this behavior has been occasionally seen in hydrocarbon solutions this appears to be the first case where such behavior has been observed in homogenous aqueous solutions.

The solutions described above based on water soluble polymer complexes exhibit unusual and potentially valuable properties. Specifically, the area of water based lubricants is one where solutions which maintain constant viscosities over wide temperature ranges would be especially valuable. It is evident that the individual polymer components in their uncomplexed state would decrease monotonically in viscosity with increasing temperature. Typically a value at 78° C. would be only 1/5 of the value observed at 0° C. Clearly this invention offers a new approach to control of viscosities of aqueous solutions. It is clear that this approach is applicable to a wide variety of water based fluid viscosity control including cutting fluids hydraulic fluids, and drilling muds.

Furthermore, the exceptional behavior where solution viscosity can actually increase as the polymer complex solutions are diluted is a feature which can be exceptionally valuable where viscosity control with dilution is desired such as oil recovery processes.

What is claimed is:

1. A polymer complex dissolved in water solution which comprises a mixture of:
   (a) a copolymer of a first water soluble polymer backbone and an anionic comonomer, said, anionic comonomer being about 1 to about 50 weight percent of said copolymer; and
   (b) a copolymer of a second water soluble polymer backbone and a cationic comonomer, said cationic comonomer being about 1 to about 50 weight percent of said copolymer wherein the equivalence ratio of the copolymer of the water soluble polymer backbone and cationic comonomer to the copolymer of the water soluble polymer backbone and anionic comonomer is about 30/1 to 1.1/1 or 0.9/1 to 1/30.

2. A polymer complex according to claim 1 wherein said first and said second water soluble polymer backbones are selected from the group consisting of polyacrylamide, polyvinyl pyrrolidone, polyethylene oxide, polyvinyl alcohol and polymethacrylamide.

3. A polymer complex according to claim 1 wherein said first or said second water soluble polymer backbone is polyacrylamide.

4. A polymer complex according to claim 1 wherein:
   (a) said cationic comonomer is selected from the group consisting of N, N,N-trimethylammonium-propylmethacrylamide, vinyl pyridine and vinyl ditolyl guanadine; and
   (b) said anionic comonomer is selected from the group consisting of styrene sulfonate, vinyl sulfonate, allyl sulfonate, acrylate and acrylamidopropyl sulfonate.

5. A polymer complex according to claim 1 wherein:
   (a) said cationic comonomer is selected from the group of $\alpha$, $\beta$ ethylinically unsaturated monomers having quatinary bases or vinyl pryidine as functional groups.
   (b) said anionic comonomer is selected from $\alpha$, $\beta$ ethylenically unsaturated monomers having sulfonate, carboxylate or phosphonate functional groups pendant thereto as metal or amine neutralized salts.

6. A polymer complex according to claim 1, wherein the ratio of the copolymer of the water soluble polymer backbone and cationic comonomer to the copolymer of the water soluble polymer backbone and anionic comoner is about 45/1 to 1.1/1 and 1/45 to 1/1.1.

7. An aqueous solution containing a polymer complex according to claim 1 as a water based lubricant having a solution viscosity-temperature relationship such that the viscosity, as measured in centipoise at a shear rate of 1 sec$^{-1}$ exhibits a ratio $$\frac{\text{viscosity at 75° C.}}{\text{viscosity at 0° C.}} \cong .25$$

8. An aqueous solution according to claim 7 as a water based transmission fluid.

9. An aqueous solution according to claim 7 as a water based hydraulic fluid.

* * * * *